United States Patent [19]

Orem et al.

[11] 4,191,055
[45] Mar. 4, 1980

[54] DYNAMIC IMBALANCE DETERMINING SYSTEM

[75] Inventors: Donald E. Orem, Indianapolis; Vernon P. Holmes, Danville, both of Ind.; Thomas J. Bacsanyi, Novi, Mich.

[73] Assignee: Ransburg Corporation, Indianapolis, Ind.

[21] Appl. No.: 927,760

[22] Filed: Jul. 25, 1978

[51] Int. Cl.² ............................................. G01M 1/22
[52] U.S. Cl. ..................................................... 73/462
[58] Field of Search .......................... 73/459, 462–465, 73/471–472

[56] References Cited

U.S. PATENT DOCUMENTS

| | | | |
|---|---|---|---|
| 2,898,764 | 8/1959 | Kinsey et al. | 73/483 |
| 2,980,331 | 4/1961 | Gruber et al. | 73/462 X |
| 3,036,467 | 5/1962 | McWhorter | 73/459 |
| 3,924,473 | 12/1975 | Maus | 73/471 |
| 4,031,760 | 6/1977 | Muller | 73/462 X |
| 4,046,017 | 9/1977 | Hill | 73/462 |

FOREIGN PATENT DOCUMENTS 1123638  6/1956  France ......................................... 73/66

*Primary Examiner*—Anthony V. Ciarlante
*Attorney, Agent, or Firm*—Jenkins, Coffey, Hyland, Badger & Conard

[57] ABSTRACT

An imbalance determining system for a dynamic balancing machine for two-plane balancing of rotary elements such as vehicle wheel-and-tire assemblies includes a chuck and spindle mounted in a spindle housing in vibration-isolation orientation on a machine base. The rotary element is brought to speed by one or more drive mechanisms which are mounted on the machine base to move between a driving orientation in contact with the rotary element and a storage orientation out of contact with the rotary element. Vibrational forces resulting from imbalance in the moving rotary element are transmitted through the spindle to the housing. Two vertically spaced load cells are mounted adjacent the spindle housing, and are responsive to forces transmitted through the spindle to generate input electrical signals related to the amounts and locations of imbalance in two planes of the rotary element. These input signals are processed to generate a system of equations soluble to resolve the input signals into signals indicative of the amount and location of imbalance in each of the two planes.

13 Claims, 8 Drawing Figures

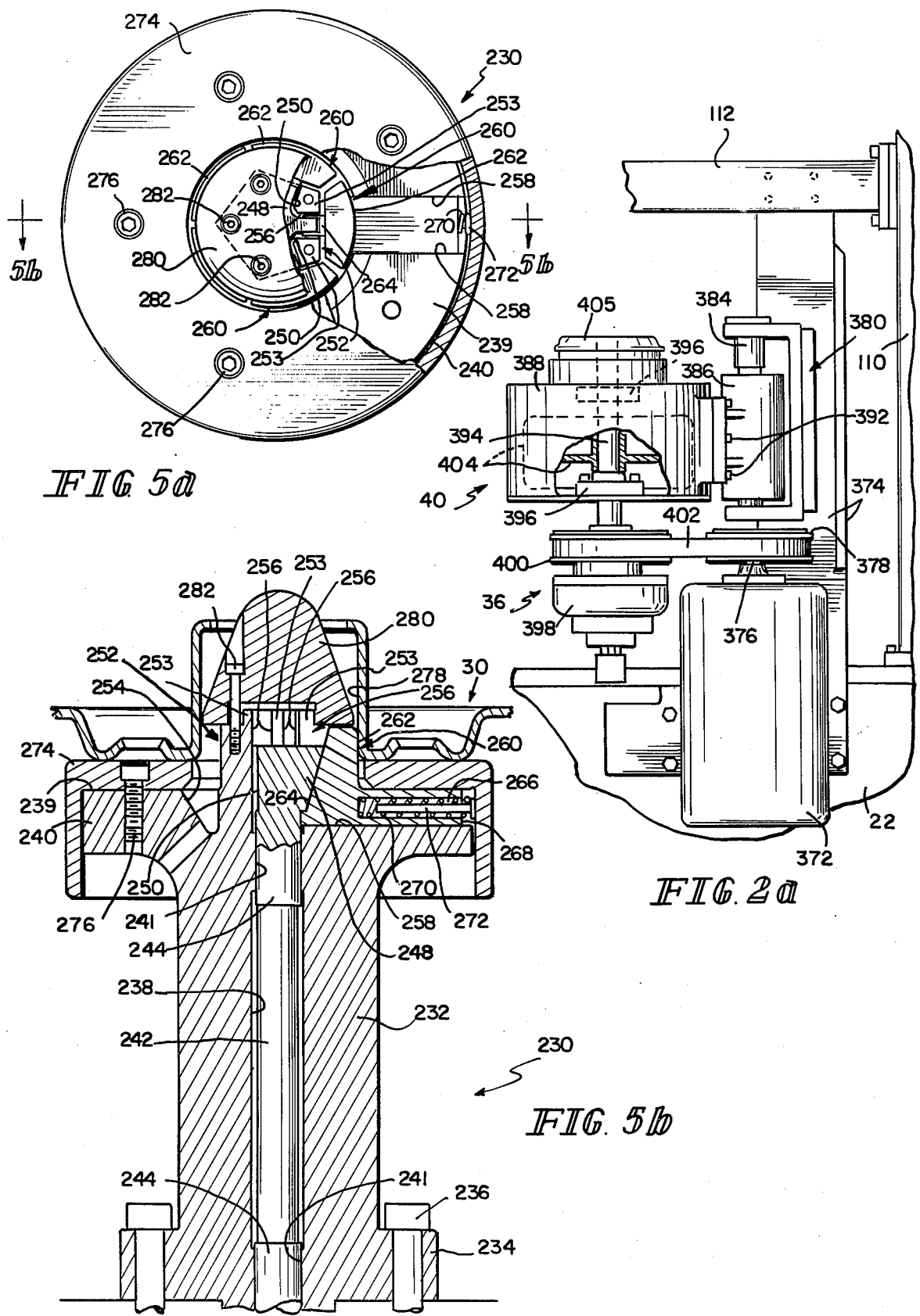

DYNAMIC IMBALANCE DETERMINING SYSTEM

This invention relates to balancing equipment and techniques, and particularly to a multiple plane dynamic balancing system.

Dynamic balancing systems are known. Some such systems utilize load cells associated with means supporting the rotating element to be balanced to respond to vibrational forces due to imbalance in the element and produce electrical signals related to that imbalance. Some such machines are capable of producing signals relative to imbalance in more than one plane. An example of such apparatus is Curchod et al, U.S. Pat. No. 3,910,121. There are certain weaknesses in systems of the type described in the aforementioned patent. Among these are that the load cells of a system of this type must be aligned with the planes in which the imbalance is to be determined in order to produce usable imbalance-related signals.

Of course, it should be understood that the imbalance in any rotary article does not necessarily lie in the two planes. Rather, for purposes of convenience, the imbalance is thought of as lying in the two planes although it will typically be distributed throughout the rotary element. In the example of a vehicle wheel-and-tire assembly, the two planes typically will be the planes of the inner and outer wheel rim areas. It is in these two areas that balance-correcting weights are typically attached to the wheel-and-tire assembly.

In this regard, it should further be noted that the radial locations of balance-correcting weights will be known and fixed for any given vehicle wheel-and-tire assembly. That is, correcting weight will only be attached to the assembly at some predetermined radius from the axis of revolution of the assembly (the center of the vehicle axle). Typically, this radius will be the radius from the wheel center to the radially outer extent of the wheel rim.

A further weakness of systems of the type described in the aforementioned patent is that at least a portion of the drive mechanism remains coupled to the rotary element during the imbalance measurement cycle. Thus, any imbalance in the drive mechanism will be reflected to a degree in the measurement of article imbalance.

It is an object of the present invention to provide a dynamic imbalance determining system which overcomes these weaknesses in the prior art.

According to the invention, an apparatus is provided for determining amount and location of imbalance in each of two planes in an article having two planes generally parallel to each other in which it is to be balanced and an axis generally perpendicular to the two planes about which it is to revolve. The apparatus includes means for securing the article in an orientation for revolution about the axis, means for revolving the article about the axis, means for generating input signals in response to force exerted by the article, means for processing the input signals to develop first output signals containing information relative to the amount and location of imbalance in the first plane and second output signals containing information relative to the amount and location of imbalance in the second plane. Means are provided for coupling the generating means to the processing means. The input signal generating means includes first and second input signal generating means, means for supporting the first input signal generating means at a first predetermined, non-zero distance from the second signal generating means along the axis and means for supporting the second signal generating means at a second predetermined non-zero distance from the first plane along the axis.

Further according to the invention, the input signal generating means includes a lever for providing components of force in planes generally parallel to the first and second planes in response to article rotation, and means for coupling the lever to the article securing means. The first and second input signal generating means includes first and second load cells, respectively, and the means for supporting the first and second input signal generating means includes means for maintaining the first and second load cells in spaced relation along the lever. The forces on the lever due to imbalance in the first and second planes of the revolving article cause the first and second load cells to generate first and second input signals, respectively. The processing means includes means for resolving the first and second output signals into signals indicative to the amount and location of imbalance in the first and second planes. Again, the term "location of imbalance" typically will be only an angular location of imbalance from a predetermined reference zero angle, since the radial location of the imbalance will be assumed, for a particular rotary element, to lie at a radius from the center of revolution of the article at which the balance-correcting weight is to be attached.

The lever comprises a housing rotatably supporting a spindle upon which the element is mounted. The housing is mounted for limited movement from a base which typically includes other stations, such as a "load" station and an "orient" station. The articles are serially loaded from the load station onto the imbalance determining apparatus. After their imbalance amounts and locations are determined, such articles are transferred from the imbalance determining apparatus to the orient station and are oriented in accordance with the locations of imbalance in the first and second planes and are marked so that subsequent correcting weights can be added at the proper locations. As used herein, the term "amount of imbalance" is used alternatively to mean either the amount which is necessary to add to a particular location in a plane of a rotary element, or an amount which is required to be removed from a particular location in a plane of a rotary element in order to bring the element into proper balance. It will be appreciated by those skilled in the art that the location at which these corrective weights are to be added or removed are typically 180° of rotation apart on the element.

Further according to the invention, the means for generating first and second output signals comprises means for processing the input signals from the first and second load cells to resolve such input signals in accordance with the following relationships:

$$W_1 = \frac{g[(d_3 + d_2) F_2 \cos \phi_2 - (d_3 + d_2 + d_1) F_1 \cos \phi_1]}{d_3 \, rw^2 \cos \theta_1}$$

$$\theta = \tan^{-1} \frac{W_{1y}}{W_{1x}}, \text{ where}$$

$$W_{1x} = \frac{g}{rw^2} \left[ \left(1 + \frac{d_2}{d_3}\right) F_2 \cos \phi_2 - \left(\frac{d_3 + d_2 + d_1}{d_3}\right) F_1 \cos \phi_1 \right],$$

and $$W_{1y} =$$

-continued $$\frac{g}{rw^2}\left[\left(1+\frac{d_2}{d_3}\right)F_2\sin\phi_2 - \left(\frac{d_3+d_2+d_1}{d_3}\right)F_1\sin\phi_1\right];$$

$$W_2 = \frac{g[(d_2+d_1)F_1\cos\phi_1 - d_1F_2\cos\phi_2]}{d_3 rw^2 \cos\theta_2};$$

$$\theta_2 = \tan^{-1}\frac{W_{2y}}{W_{2x}}, \text{ where}$$

$$W_{2x} = \frac{g}{rw^2}\left[\left(\frac{d_1+d_2}{d_3}\right)F_1\cos\phi_1 - \frac{d_2}{d_3}F_2\cos\phi_2\right],$$

and $$W_{2y} = \frac{g}{rw^2}\left[\left(\frac{d_1+d_2}{d_3}\right)F_1\sin\phi_1 - \frac{d_2}{d_3}F_2\sin\phi_2\right]:$$

In which:

$F_1$ is the force component perpendicular to the article axis of revolution on the first load cell, $F_2$ is the force component perpendicular to the article axis on the second load cell, g is the gravitational constant, r is the predetermined distance from the article axis to the point of correction in both the first and second planes, w is the radian frequency of revolution of the article, $\phi_1$ is the phase angle between the location of imbalance in the first plane and a predetermined reference location, $\phi_2$ is the phase angle between the location of imbalance in the second plane and the reference location, $d_1$ is the first distance, $d_2$ is the second distance, $d_3$ is the third distance, $W_1$ is the amount of imbalance in the first plane, $W_{1x}$ is the component of that imbalance parallel to a first predetermined coordinate, $W_{1y}$ is the component of that imbalance parallel to a second coordinate perpendicular to the first, $W_2$ is the amount of imbalance in the second plane, $W_{2x}$ is the component of that imbalance parallel to a first predetermined coordinate, and $W_{2y}$ is the component of that imbalance parallel to a second coordinate perpendicular to the first.

The invention will be understood by referring to the following description and accompanying drawings which illustrate the invention. In the drawings:

FIGS. 2 and 2a are partly sectioned and fragmentary side elevational views of the machine of FIG. 1;

Figure 3:
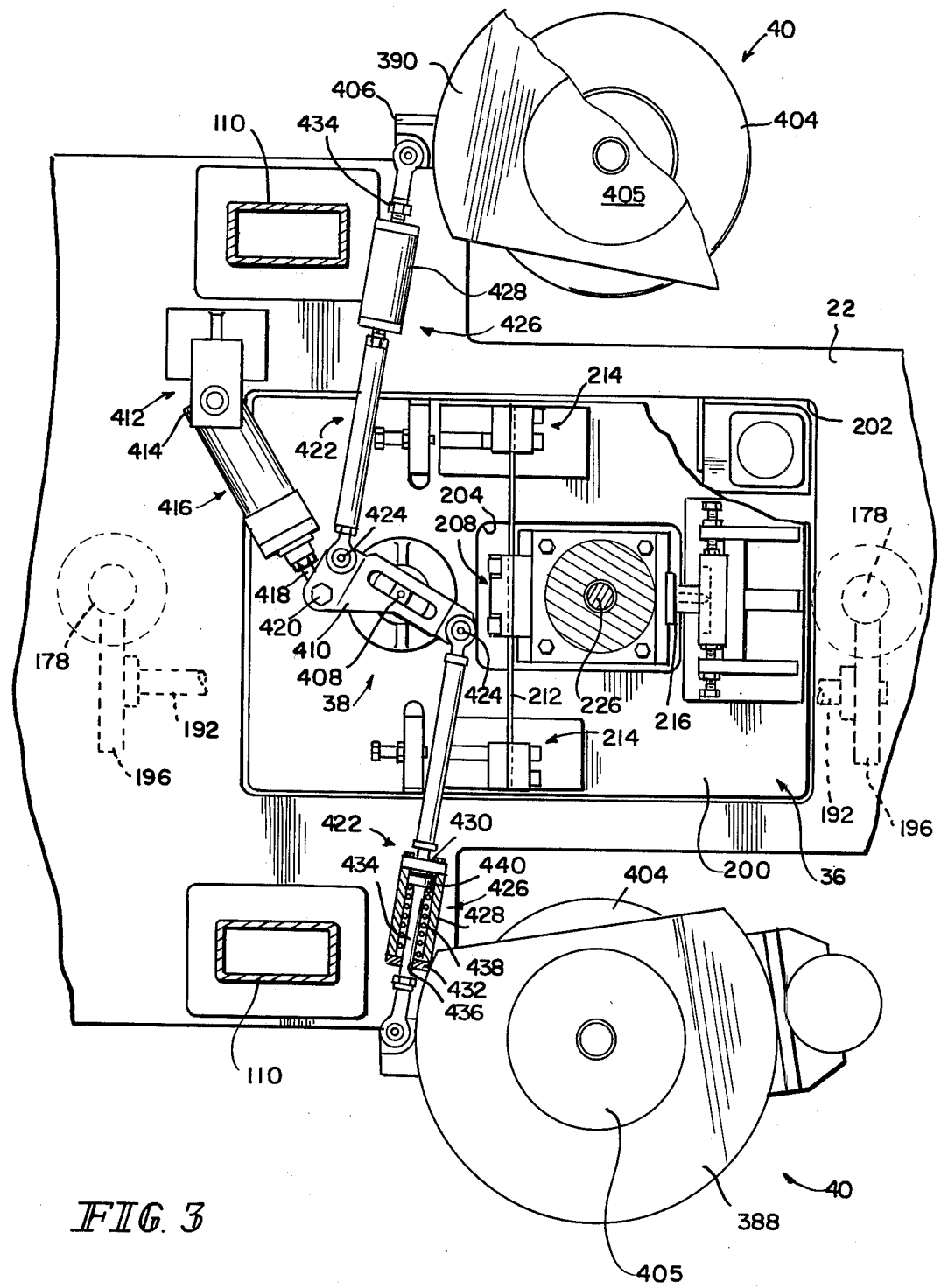
FIG. 3 is a fragmentary sectional top plan view, partly broken away, of the apparatus of FIGS. 1-2, taken generally along section lines 3—3 of FIG. 1 to show the inventive apparatus.
Figure 4:
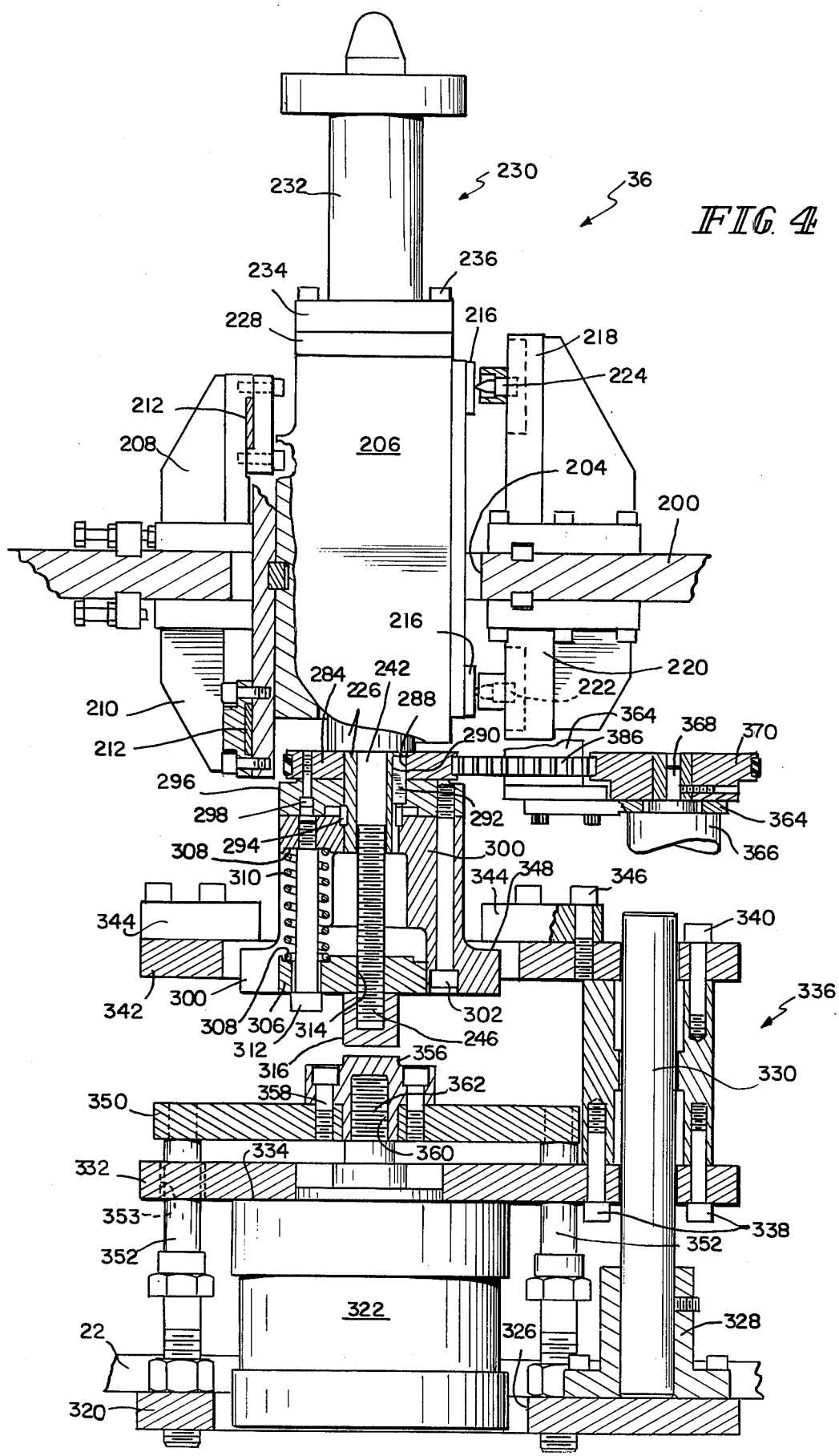
FIG. 4 is a fragmentary sectional side elevational view, partly broken away, of the apparatus of FIG. 3, taken generally along section lines 4—4 thereof.
Figure 6:
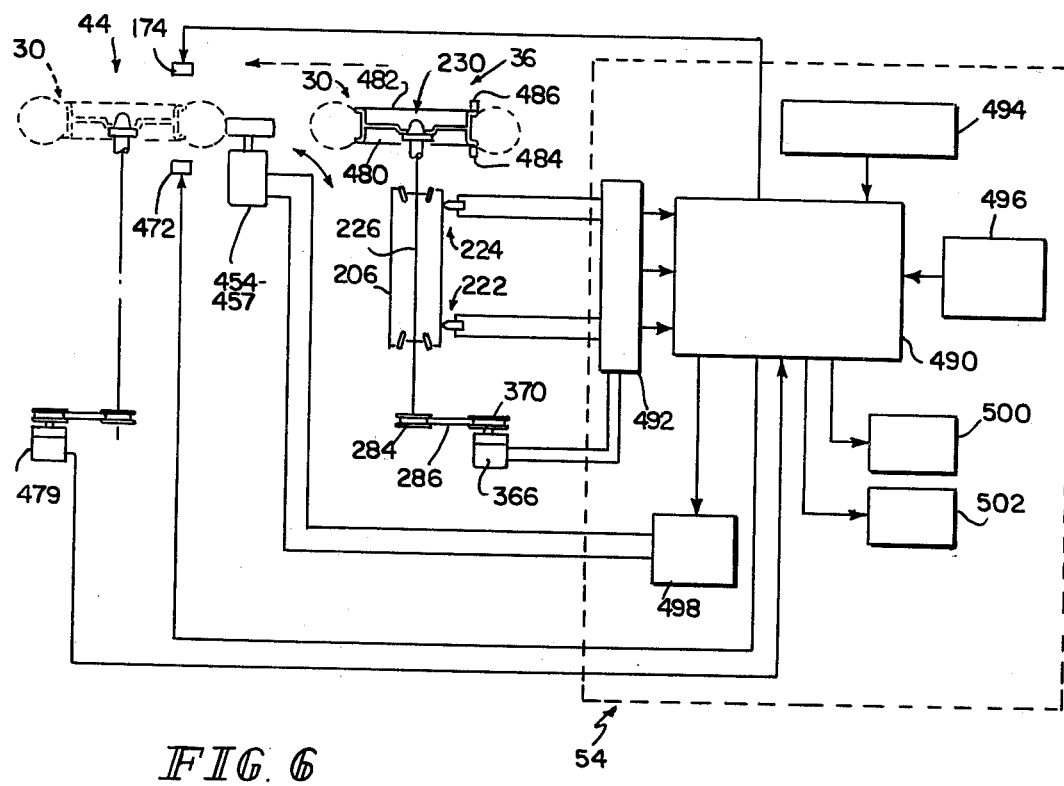

FIGS. 5a-b are fragmentary and partly sectioned top plan and side elevational views, respectively, of a detail of the apparatus of FIGS. 3-4;

FIG. 6 is a highly diagrammatic side elevational view of the machine of FIGS. 1-5.

Figure 1:
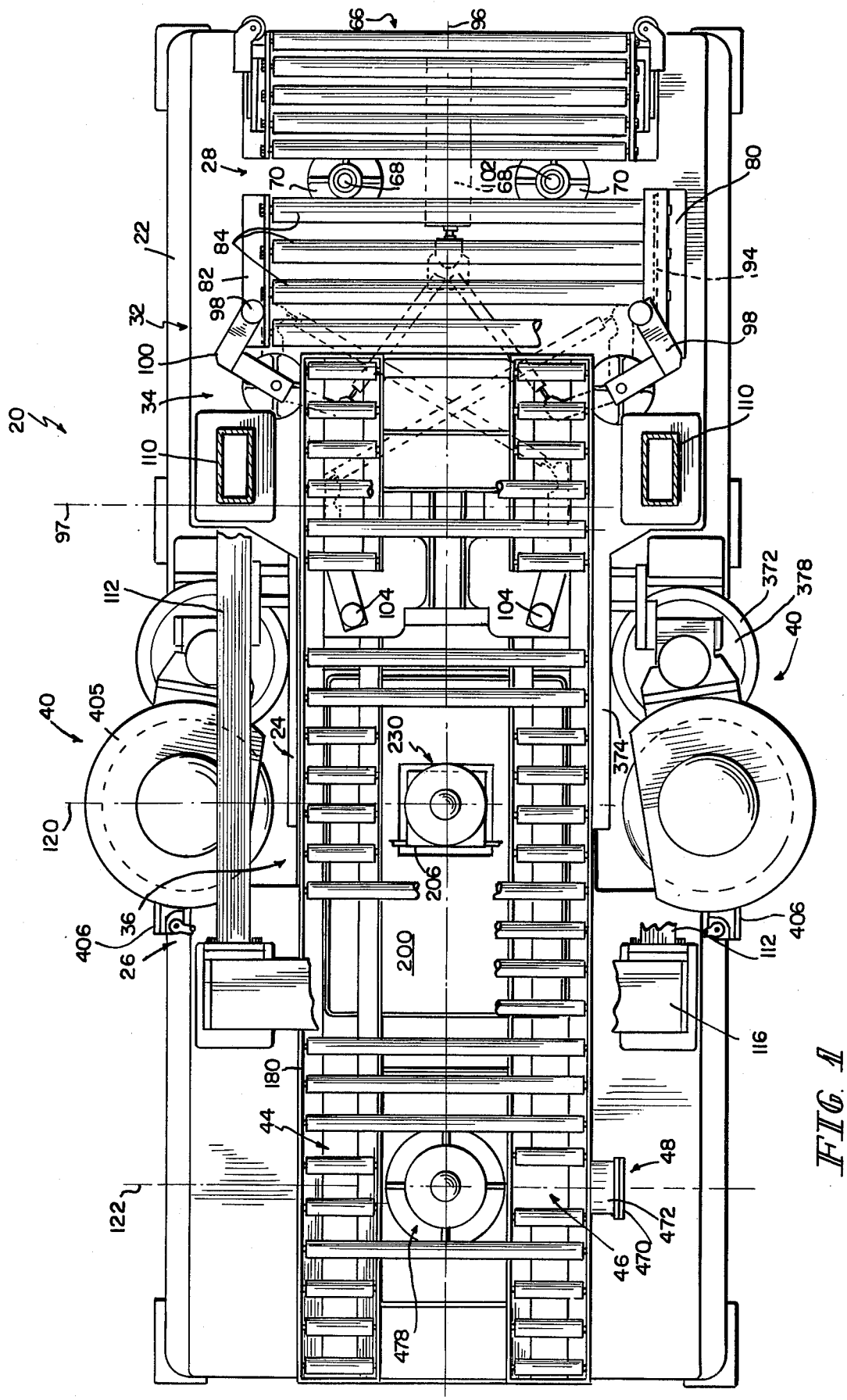
FIG. 1 is a partly sectioned and fragmentary top plan view of a conveyorized and automated wheel-and-tire assembly testing machine including the apparatus of the present invention.
Figure 2:
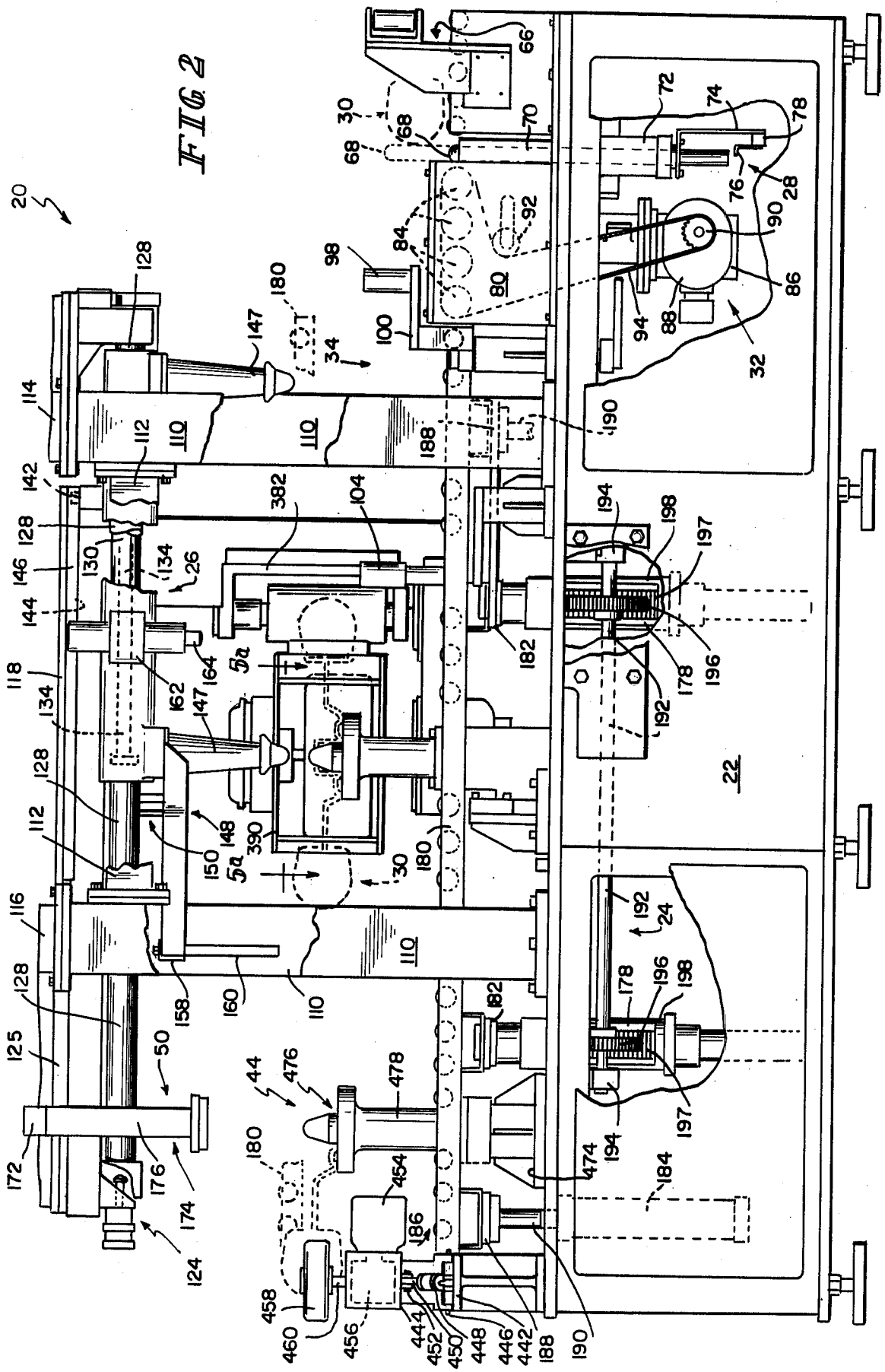

Turning now to FIGS. 1 and 2, the imbalance measuring machine 20 includes a supporting base portion 22, an elevator mechanism 24, a transfer mechanism 26, and a load station stop pin mechanism 28 for the rotary elements 30 to be balanced. In the illustrated embodiment, the rotary elements are wheel-and-tire assemblies for vehicles. The machine 20 further includes a load station drive mechanism 32, a load station centering mechanism 34, an imbalance determining station insert 36, a drive unit actuator mechanism 38 (see FIGS. 3-4), two wheel-and-tire drive units 40 for station 36, and a locking and unlocking mechanism 42 (see FIGS. 3-4) for station 36. Further, the machine 20 includes an orient station spindle 44, a wheel-and-tire assembly drive mechanism 46 for station 44, a "plane one", or lower plane, marking mechanism 48 for station 44, a "plane two", or upper plane, marking mechanism 50 for station 44, a control cabinet 52 (see FIG. 6) for machine 20, and a control console 54 (see FIG. 6) from which an operator can control the assembly 20.

Much of the equipment used in the imbalance testing machine 20, such as elevator mechanism 24, transfer mechanism 26, load station mechanisms 28, 32, 34, and orient station 44 mechanisms 46, 48, 50 is of substantially standard construction such as is available on the MICRO-POISE model 1060 -WSO static balance correcting machine, available from MICRO-POISE division of Ransburg Corporation, P. O. 88512, Indianapolis, Indiana 46208. Much of this equipment operates in a known manner to transfer rotary elements 30 serially from load station 28 through the dynamic imbalance determining station 36 to the orient station 44. However, a discussion of this equipment follows for purposes of clarity.

To understand the operation of machine 20, it is necessary to understand that wheel-and-tire assemblies 30 are loaded through the load station mechanism 28, 32, 34 elevator mechanism 24 and transfer mechanism 26, onto the imbalance determining station 36 one at a time. As each rotary element 30 reaches imbalance determining station 36, it is locked in place by a chuck associated with mechanism 42, engaged by drive units 40, and brought to a predetermined rotating frequency. Drive units 40 then are disengaged from the assembly 30. As the assembly 30 coasts at about the predetermined rotational frequency, signals related to the imbalance in the assembly 30 in its lower and upper planes, one and two, respectively, are generated by apparatus to be discussed. Then the drive units 40 are re-engaged with the surface of the rotary element 30 and brake it to a stop. Mechanism 42 unlocks assembly 30 and the transfer mechanism 26 transfers the assembly 30 from the imbalance determining station 36 to the orient station spindle 44 with no change in angular position. At station 44, the drive mechanism 46 engages the assembly 30, the imbalance of which has just been determined. Mechanism 46, in response to imbalance-related signals generated as the assembly 30 spun at station 36, orients the assembly 30 for marking of the location of imbalance, first in plane one by mechanism 48, then in plane two by mechanism 50. From station 44, marked assemblies 30 are then transferred, either by known mechanism (not shown) or by hand, to a position at which balance-correcting weights are added, according to a numerical readout or other indication on control console 54, to correct the imbalance in plane one and plane two.

The base 22 of machine 20 is basically conventional. Typically, it will be constructed from steel plate of suitable thickness, cut into desired size and welded and machined. Notably, the base 22 includes two spacers 60 for mounting the locking and unlocking mechanism 42 to the base. Base 22 also includes miscellaneous access doors permitting access to the interior of the base for maintenance purposes, feet for leveling the base, lamps providing illumination of the equipment mounted on the base, and so forth. Typically, electrical service will be provided to a junction box on the base through a suitable switch to provide power for the various mechanisms mounted on the base. Pneumatic and/or hydraulic circuits and services also may be provided for such mechanisms as require them.

Wheel-and-tire assemblies 30 move along an assembly conveyor (not shown) to the inlet end 66 of machine 20. At inlet end 66, the wheel-and-tire assemblies 30 are stopped by the load station stop pin mechanism 28. As best illustrated in FIGS. 1 and 2, mechanism 28 includes stop pins 68 mounted in housings 70 and driven by pistons in pneumatic cylinders 72 between extended and retracted limits determined by the interaction of limit switch brackets 74, limit switch actuators 76 and limit switches 78 which control the pneumatic cylinder 72. The limit switches 78 are initially actuated from the control console 54 or control cabinet 52 as will be discussed to retract and permit the transfer of a single assembly 30 at a time forward from inlet end 66 past the stop pins 68. A single wheel-and-tire assembly 30 thereby reaches the load station drive mechanism 32 at a time.

Mechanims 32 include a pair of opposed support brackets 80, 82 between which are mounted four transversely extending drive rollers 84. The last, or downstream, drive roller 84 desirably may be rubber-covered. A bracket 86 (FIG. 2) is attached to base 22 to support a drive motor 88. The drive motor 88 output shaft is provided with a roller chain sprocket 90. A sprocket idler 92 is mounted from the base 22 above the motor 88. A roller chain 94 trained about sprockets 90, 92 and sprockets provided at the bracket 80 end of drive rollers 84 drives these rollers 84 to propel the single assembly 30 at a time to the center line 96 of machine 20.

As the single assembly 30 moves toward the machine longitudinal center line 96, it is also centered along the transverse axis 97 of load station 32 by a pair of tire contact arms 98 of bell cranks 100 which are linked through a piston rod of a pneumatic cylinder 102 (FIG. 1). Pneumatic cylinder 102 is actuated from the control cabinet 52 or console 54 to center the assembly 30 transversely of machine 20 as the assembly 30 is centered longitudinally of load station 32 by rollers 84. The single assembly 30 is stopped in its downstream motion at center line 96 by two tire contact arms 104 which are pivotally mounted from the base 22 and are interconnected through a system of levers and links, as best illustrated in FIG. 1, to tire contact arms 98, and thus to cylinder 102.

As best illustrated in FIGS. 1-4, the transfer mechanism 26 is mounted upon four vertical supports 110 provided on the base 22. The vertically upper ends of supports 110 are tied together through two longitudinal tie struts 112 and load end and exit end horizontal supports 114, 116, respectively. A horizontal support 118 is mounted between supports 114, 116 to extend generally longitudinally above machine 20 through logitudinal center line 96 and the transverse center line 120 of imbalance determining station 36. An adjustable shock absorber 124 is mounted from a bracket 125 mounted from support 116. A shaft 128 is supported by supports 114, 116, 118 with its axis above center line 96. Shock absorber 124 lies beside the exit end of shaft 128. A pneumatic cylinder 130 lies adjacent shaft 128 and extends from the entry end support 114 toward the exit end support 116. Pneumatic cylinder 130 is shock-mounted at both of its ends. The rod 134 associated with a piston reciprocable in pneumatic cylinder 130 extends out from the cylinder 130. A transfer tube 140, which is slightly longer than the distances between center lines 97, 120 and between center line 120, and the transverse center line 122 of orient station 44 is mounted for reciprocating movement on shaft 128 by actuation of the piston and rod 134 in cylinder 130. To insure that the motion of transfer tube 140 along shaft 128 is as linear as possible when assemblies 30 are transferred between stations 32, 36, and 36, 44, tube 140 is provided with a heavy duty cam follower 142 which rides between a pair of spaced, parallel, longitudinally extending cam surfaces 144 provided on the underside of a bracket 146 which extends generally between supports 114, 116 on support 118. The transfer tube 140 and piston rod 134 are connected through a rod mounting bracket 148. Rod mounting bracket 148 is attached, e.g., by welding, to the underside of transfer tube 140 adjacent the exit end of the transfer tube. A bracket 150 mounted on bracket 148 provides the connection between rod 134 and tube 140. Transfer tube 140 is thereby driven longitudinally of shaft 128 by actuation of pneumatic cylinder 130 through arm 150. Rod mounting bracket 148 supports a pair of side-by-side pusher rod mounting brackets 158 which vertically adjustably carry pusher rods 160. Transfer tube 140 also supports a stabilizer rod housing 162 intermediate its entry and exit ends. A stabilizer rod 164 is vertically adjustably supported in housing 162.

A plane two angle marking mounting bracket 172 extends outwardly from one of the side walls of bracket 125 generally radially of an assembly 30 at the orient station 44. A plane two angle marker 174 is mounted at the end of a depending angle marker spacer 176 at the outer extent of bracket 172.

The elevator mechanism 24 is best understood by referring to FIG. 2. Mechanism 24 includes two elevator lift tubes 178 which are vertically oriented and spaced logitudinally along the center line 96 of machine 20 beneath a roller conveyor bed 180. The upper end of each lift tube 178 fits into a socket 182 provided on the underside of roller bed 180. Pneumatic lift cylinders 184 are mounted from the base 22, one between the entry end 66 of machine 20 and the upstream socket 182, and one between the downwstream socket 182 and the exit end 186 of machine 20. Heads 188 for receiving the ends of the piston rods 190 associated with cylinder 184 are mounted on the underside of roller bed 180. An equalizer shaft 192 is journal mounted at 194 from base 22 for rotation about a horizontal axis. Shaft 192 carries pinion gears 196 adjacent its ends. The teeth of gears 196 engage rack teeth 197 provided on the sides of elevator lift tubes 178 through openings provided in the sides of the housings 198 provided on base 22 in which the lift tubes 178 are slidably mounted. The racks 197, gears 196, shaft 192 and lift cylinders 184 insure a highly uniform elevation of the roller bed 180 prior to the transfer of assemblies 30 between stations 28, 36 and 36, 44, respectively.

Transfer pilots 147 are mounted adjacent the ends of tube 140, the transfer pilots 147 being centered on center line 96 and spaced apart a distance equal to the distance between center lines 97, 120 and 120, 122. Transfer pilots 147 are proportioned and designed to fit into the hub openings or wheel centers of assemblies 30 when such assemblies are elevated by the elevator mechanism 24 to the vertical height of heads 147.

Turning now to the imbalance determining station 36, details of that station are best illustrated in FIGS. 3 and 4. Station 36 includes an insert 200 which is basically a rectangular plate which fits into a generally rectangular opening 202 provided in base 22. Insert 200 is provided with an opening 204 in which a spindle housing 206 is supported by upper and lower inboard ribbon clamps 208, 210, respectively. The clamps 208, 210, clamp spring steel ribbons 212 which extend horizontally and generally transversely in the machine 20 base 22. The ends of ribbons 212 are clamped and dowelled by two pairs of transversely opposed outboard ribbon clamps 214 (FIG. 3) mounted on insert 200. On the entry, or upstream, side of spindle housing 206, two vertically aligned contact pads 216 are provided. Insert 200 is further provided with upper and lower mounting brackets 218, 220. A first, or lower load cell 222 (FIG. 4) mounted upon a stud is supported in the lower bracket 220, and a second, or upper load cell 224 mounted upon a stud is supported from the upper bracket 218. The load cells are of a type such as, for example, the SUNDSTRAND model 922-F3 or the PCB Piezotronics model 208A03. These load cells have knife edges at their ends, the knife edges at the ends of each load cell being turned at 90° to one another. The knife edges at the forward, or entry, end of the load cells rest against their respective mounting brackets. The rearward, or exit, ends of the load cells rest against their respective contact pads 216. It will be appreciated that any forces on the spindle housing 206 will be transmitted to the load cells 222, 224, and that the load cells 222, 224 will produce electrical signals related to such forces on housing 206.

A balance spindle member 226 is rotatably mounted in housing 206 by keys and bearing (not shown). Spindle 226 includes an upper adapter plate 228 for attachment of balance spindle tooling 230, as illustrated in FIGS. 5a-b. The tooling includes an adapter body 232 having a lower flange 234 for attachment to plate 228 by suitable means, such as cap screws 236. A central, circular cross-section passageway 238 extends axially through adapter body 232 from the bottom of flange 234 to the upper surface 239 of an upper flange 240. Pasageway 238 is provided with a pair of spaced reduced-cross-section, or boss, regions 241 providing bearing surfaces for a draw bar 242. Draw bar 242 is provided with cooperating bosses 244. Draw bar 242 is freely slidable in passageway 238. Draw bar 242 is sufficiently long that its extends downward through an aligned passageway (not shown) in the balance spindle 226 and outward from the bottom end of the balance spindle 226. At its lower end 246, draw bar 242 is threaded (FIG. 4).

At its upper end 248, draw bar 242 is provided with an upwardly and outwardly flaring, somewhat frustoconical region (FIG. 5b). This region 248 contains a plurality of flutes 250, illustratively five. The adapter body 232 further includes a castellate hub 252 which rises above the upper surface 239 of flange 240. The hub 252 is separated from surface 239 by a trough 254. Hub 252 comprises five equally peripherally spaced post-like sections 253 surrounding passageway 238 and separated by slideways 256. Upper surface 239 is provided with five aligned, broader slideways 258. Five chucking jaws 260 are freely radially movably positioned in slideways 258. The chucking jaws 260 include chucking surfaces 262 and actuating tongues 264. Actuating tongues 264 are freely radially slidable in slideways 256. Each jaw 260 further includes a radially inwardly extending blind bore 266 from a radially outer surface 268. A compression spring 270 is located in each of bores 266, along with a spring guide pin 272. Each pin 272 is provided with a head to retain its respective spring 270 within bore 266. The chucking jaws 260 are captured in slideways 258, and spring urged inwardly toward the upper end 248 of draw bar 242 by a retainer plate 274 which is placed over the upper surface 239 of flange 240 and attached to flange 240 by suitable means, such as cap screws 276. It will be appreciated that rapid rotation of the tooling 230 as the spindle 226 is rotated forces chucking jaws 260 radially outwardly against the compression of springs 270, due to centrifugal force. It will further be appreciated that this outward motion of jaws 260 permits the ridges between flutes 250 of upper end 248 of draw bar 242 to move downward under the draw bar's own weight against actuating tongues 264, thereby locking chucking jaws 260 surfaces 262 tightly against the wheel center or hub hole 278 of an assembly 30. A pilot cap 280 is provided to cover the hub 252. The pilot cap 280 is attached to the hub 252 by suitable means, such as cap screws 282.

The locking and unlocking mechanism 42 for station 36 is best illustrated in FIG. 4. A pulley 284 for use with a toothed gear belt 286 is keyed by means of keyways 288, 290 on the pulley 284 and spindle 226, respectively, and a key 292, to the spindle 226. Key 292 is retained in keyways 288, 290 by a split ring 294. A mounting plate 296 is attached to the pulley 284 by suitable means such as cap screws 298, only one of which is shown. A slide block 300 is attached to the underside of mounting plate 296, as by cap screws 302, only one of which is shown. An unlock spider 306 is threaded on end 246. Unlock spider 306 and slide block 300 cooperate to provide a plurality of spring wells 308 which house standard compression die springs 310. The springs 310 are retained in their respective wells by cap screws 312. End 246 protrudes through a passageway 314 in the center of unlock spider 306 and an upper unlock pusher block 316 is threaded onto end 246.

Directly beneath pusher block 316, base 22 is provided with an air cylinder mounting plate 320 for a large bore short-stroke air cylinder 322. The lower end 324 of air cylinder 322 is received in a socket 326 provided in mounting plate 320. Three slide rod mounting sockets 328 (only one of which is shown) are mounted in an equilateral triangular array about socket 326 on mounting plate 320. Slide rods 330 are mounted in the sockets 328 to extend vertically upward around slide block 300. An upper air cylinder plate 332 is slidably mounted on rods 330 and rests against the top end 334 of air cylinder 322. Combination spacer-bearings 336 are slidably mounted on rods 330. Cap screws 338 attach plate 332 to bearings 336. Similar cap screws 340 attach an unlock jaw mounting plate 342 to the upper ends of bearings 336. Three peripherally equally spaced unlock jaws 344 are attached by cap screws 346 to the upper surface of mounting plate 342 to extend into interfering relationship with an outwardly directly flange 348 on slide block 300. The air cylinder 322 supports a rest plate 350 which is slidably guided with respect to plate 332 by bolts 352 which are slidable in passageways 353 in plate 332. Bolts 352 abut adjustable stop bolts 354 in the mounting plate 320 to stop downward motion of rest plate 350. A lower unlock pusher block 356 is attached to the center of rest plate 350 by cap screws 358. A threaded passageway 360 in the underside of pusher block 356 receives the threaded end 362 of the piston rod of air cylinder 322.

It will be appreciated that this assembly 42 causes jaws 344 to clamp downward upon flange 348 and, simultaneously forces the draw bar 242 upward, when air cylinder 322 is actuated to push block 356 against block 316. The clamping jaws 344 against flange 348 prevents thrust damage which might otherwise occur to spindle 226 and associated components through repeated unlocking operations. The upward movement at the upper end 248 (FIGS. 5a–b) of draw bar 242 releases chucking jaw 260 working surfaces 262 so that jaws 260 slide radially inwardly in slideways 256 under the urging of springs 270 to release the wheel-and tire assemblies 30. It will further be appreciated that when the pressure is released in cylinder 322, springs 310 urge spider 306 downward pulling the draw bar 242 downward and returning the chucking jaws 260 to locking orientation in a wheel center 278.

With reference again to FIG. 4, it will be noted that a bracket 364 is attached to the lower end of spindle housing 206. An encoder 366, such as the LITTON model 76 15V DC input #76BD365E1 is mounted on bracket 364. The input shaft 368 of encoder 366 is provided with a toothed gearbelt pulley 370. Gear belt 286 is trained about pulley 370, and rotation of the spindle 226 is thereby transmitted to the encoder 366. In this manner, the encoder 366 produces an output signal related to the rotational position of an assembly 30, the imbalance of which is being determined.

Turning now to FIGS. 1–3, the drive units 40 for accelerating an assembly 30 on spindle 226 to desired rotational rate, and for braking such rotation will be explained. Each assembly 40 includes a drive motor 372 mounted from a suitable bracket 374. The motors 372 are mounted on the opposite longitudinal sides of the base 22 adjacent the imbalance determining station 36. The output shaft 376 of each motor 372 is equipped with a toothed drive pulley 378. Front and rear drive unit mounting brackets 380, 382, respectively, are mounted above the drive motors 372 on base 22. A pivot shaft 384 is attached to each of brackets 380, 382. Each shaft 384 pivotally supports a pivot housing 386. The pivot axes of housing 386 (the axes of shafts 384) coincide with the axes of output shafts 376 of motors 372. Front and rear drive wheel housings 388, 390, respectively, are attached to housing 386 by cap screws 392. Each housing 388, 390 rotatably supports a drive shaft 394 in suitable bearings 396. A pneumatic clutch 398 is mounted at the lower end of each drive shaft 394. Suitable pneumatic clutches 398 are HORTON model HW-HS pneumatic clutches. A toothed gearbelt pulley 400 is coupled to the input side of each clutch 398. Toothed gear belts 402 are trained about respective drive pulleys 378 and pulleys 400. A drive wheel 404 is mounted on each drive shaft 394 within its respective drive wheel housing 388, 390. Drive shafts 394 extend outwardly through the tops of drive wheel housings 388, 390, where pneumatic brakes 405 are attached to the upper ends of the drive shafts. Suitable brakes are the HORTON model T-800 pneumatic brakes.

As best illustrated in FIG. 3, a toggle link bracket 406 is attached to the underside of each drive wheel housing 388, 390. A toggle shaft, or pivot shaft, 408 is mounted on the base 22 to extend through an opening 409 in insert 200. Shaft 408 pivotally supports a toggle link 410. Insert 200 is provided with a toggle cylinder mounting plate and bracket assembly 412 in which is mounted the trunnion end 414 of a pneumatic toggle cylinder 416. The piston rod 418 associated with toggle cylinder 416 is pivotally attached at 420 to toggle link 410. Connecting link assemblies 422 connect points 424 of toggle link 410 to brackets 406 on housings 388, 390. It will be appreciated that actuation of the cylinder 416 to project piston rod 418 therefrom rotates toggle link 410 counterclockwise on shaft 408, as viewed in FIG. 3, to move housings 388, 390, and their associated drive wheels 404 toward balance spindle 226. Actuation of toggle cylinder 416 to retract piston rod 418 rotates toggle link clockwise, as viewed in FIG. 3, to move housings 388, 390 and their associated drive wheels 404 away from spindle 226.

Each connecting link assembly 422 provides for a certain amount of pressure equalization or compensation through toggle link spring assemblies 426. Each assembly 426 includes a spring housing 428 with inboard and outboard spring housing caps 430, 422, respectively, attached. A pressure compensator rod 434 is attached to each toggle link bracket 406 and extends slidably through an opening 436 provided in the outboard spring housing cap 432. A standard die spring 438 is positioned on each rod 434 between a stop 440 on the rod 434 and the outboard spring housing cap 432. These assemblies 426 equalize the pressures applied to the tires of assemblies 30 by both units 40 and absorb some of the shock as the drive units 40 are moved between their use orientation, with drive wheels 404 in contact with the perimetral surface of the tire during acceleration and braking of the assembly 30, and their orientations out of engagement with the assembly 30.

With reference to FIGS. 1,2, the orient station wheel-and-tire drive mechanism 46 will be explained. Mechanism 46 includes a mounting plate 442 for mounting the mechanism on the base 22 adjacent the orient station spindle 44. A bracket 444 for the drive mechanism is pivotally mounted at 446 from mounting plate 442. A pneumatic cylinder 448 is pivotally mounted to the mounting plate 422 outboard from bracket 444 and the pison rod 450 associated with pneumatic cylinder 448 is pivotally mounted to the bracket 444 at 452. In this manner, bracket 444 swings in a generally vertical arc about the axis of pivot 446 in response to actuation of pneumatic cylinder 448.

A drive motor 454 is supported by a speed reducer which, in turn, is supported by bracket 444. The drive motor may be of any suitable type, such as, for example, the GENERAL ELECTRIC No. 58CD56ND9A, ½ horsepower, 1750 r.p.m., or equivalent. The speed reducer 456 may of any suitable type, such as, for example, the RELIANCE ELECTRIC TIGEAR speed reducer #56-CB-15, with 15:1 ratio gear and type "B" case. Drive motor 454 is coupled to speed reducer 456 through a brake 457. Brake 457 may be of any suitable type such as the WARNER ELECTRO BRAKE Model No. EM-50-20. A drive wheel 458 is attached to the output shaft 460 of speed reducer 456. This assembly, standard on the MICRO-POISE 1060-WSO machine, provides an air signal driving the piston in cylinder 448, and signals to the motor/brake either to rotate such an assembly 30 on orient station spindle 44, or to stop rotation of such as assembly.

A plane one angle marker mounting bracket 470 (FIG. 1) is mounted on base 22 adjacent orient station drive mechanism 46. Bracket 470 supports a plane one angle marker assembly 472 beneath the lower plane, or plane one, of the wheel-and-tire assembly 30.

The orient spindle 44 is of basically conventional construction, and includes a spindle housing 474 attached to base 22 and rotatably housing an orient spindle 476 by means of suitable bearings (not shown). Suitable tooling 478, including, for example, a conventional pilot cap, may be provided on the orient spindle 476 as necessary.

Turning now particularly to the operation of the imbalance determining station 36, it may best be described with reference to the highly simplified diagram of FIG. 6. FIG. 6 shows, highly diagrammatically, the arrangement of spindle 226, housing 206, load cells 222, 224 and a wheel-and-tire assembly 30. The wheel-and-tire assembly 30 is illustrated, somewhat less diagrammatically. As discussed above, assembly 30 can be thought of as including a first, or lower, plane 480 in which assembly 30 is to balanced, and a second, or upper, plane 482 in which it is to be balanced. Mathematically, this is consistent with the practice of attaching balance-correcting weights to the wheel rim on the inner side (toward the vehicle) and outer side (away from the vehicle). Of course, as mentioned above, imbalance is actually distributed throughout the entire assembly 30, but can be corrected by assuming that imbalances occur in planes 480, 482. FIG. 5 shows diagrammatically two imbalance masses 484, 486, occurring in plates 480, 482, respectively. Again, mathematically, massess 484, 486 occur at the radius of the wheel rim, since this is where balance-correcting masses typically will be attached during the balance correction process. This radius may be represented as r. The points at which load cells 222, 224 contact housing 206 are separated by a first, predetermined distance, which may be designated $d_1$. The second load cell 224 is separated from plane 480 by a second distance which may be designated $d_2$. Planes 480, 482 are separated by a third distance which may be designated $d_3$. If the imbalance mass 484 is represented by the symbol $m_1$ and imbalance mass 486 is represented by the symbol $m_2$ the following equations may be written:

$$F_{p1} = m_1 r w^2,$$

and $$F_{p2} = m_2 r w^2$$

Where $F_{p1}$ and $F_{p2}$ are the imbalance forces in planes 480, 482, respectively, due to rotation of assemblies 30 and w is the radian frequency of rotation of assembly 30 during measurement of these forces.

The load cell forces $F_1$ (force on load cell 222 perpendicular to spindle 226) and $F_2$ (force on load cell 224 perpendicular to spindle 226) may be thought of as rotating vectors. Associated with the $F_1$ vector is a recurring phase angle $\phi_1$ measured from an arbitrary zero reference angle on an assembly 30. Associated with the $F_2$ vector is a recurring phase angle $\phi_2$ measured from the zero reference angle of the assembly 30.

If the spindle 226 and assembly 30 are thought of as a free body, first moment equations may be written as follows:

$$\Sigma M_1 = 0 = F_{p2} d_3 + F_2 d_2 - F_1 (d_1 + d_2)$$

$$\text{or: } F_{p2} = F_1 \frac{d_1 + d_2}{d_3} - F_2 \frac{d_2}{d_3} = \frac{W_2}{g} r w^2$$

and $$\Sigma M_2 = 0 - F_{p1} d_3 - F_1 (d_1 + d_2 + d_3) + F_2 (d_2 + d_3)$$

$$\text{or: } F_{p1} = F_2 \frac{d_3 + d_2}{d_3} - F_1 \frac{d_3 + d_1 + d_2}{d_3} = \frac{W_1}{g} r w^2$$

Where $F_{p1}$ is the force in plane 480 due to the imbalance mass 484 ($m_1$), $m_1 = W_1/g$, $F_{p2}$ is the force in plane 482 due to the imbalance mass 486 ($m_2$), $m_2 = W_2/g$, g is the gravitational acceleration constant, $\Sigma M_1$ is the summation of first moments about the intersection of spindle 226 and plane 480, and $\Sigma M_2$ is the summation of first moments about the intersection of spindle 226 and plane 482.

Thus, the following may be written:

$$W_1 = \frac{g}{rw^2} \left[ F_2 \left( \frac{d_3 + d_2}{d_3} \right) - F_1 \left( \frac{d_3 + d_1 + d_2}{d_3} \right) \right]$$

and $$W_2 = \frac{g}{rw^2} \left[ F_1 \left( \frac{d_1 + d_2}{d_3} \right) - F_2 \frac{d_2}{d_3} \right]$$

Each of $W_1$, $W_2$ is the vector sum of two orthogonal components, i.e., $W_{1x}$, $W_{1y}$, $W_{2x}$, $W_{2y}$. Therefore $$W_{1x} = \frac{g}{rw^2} \left[ F_2 \left( \frac{d_3 + d_2}{d_3} \right) \cos\phi_2 - F_1 \left( \frac{d_3 + d_1 + d_2}{d_3} \right) \cos\phi_1 \right]$$

$$W_{1y} = \frac{g}{rw^2} \left[ F_2 \left( \frac{d_3 + d_2}{d_3} \right) \sin\phi_2 - F_1 \left( \frac{d_3 + d_1 + d_2}{d_3} \right) \sin\phi_1 \right]$$

$$W_{2x} = \frac{g}{rw^2} \left[ F_1 \left( \frac{d_1 + d_2}{d_3} \right) \cos\phi - F_2 \frac{d_2}{d_3} \cos\phi_2 \right]$$

and $$W_{2y} = \frac{g}{rw^2} \left[ F_1 \left( \frac{d_1 + d_2}{d_3} \right) \sin\phi_1 - F_2 \frac{d_2}{d_3} \sin\phi_2 \right]$$

It will be immediately appreciated that the angular locations of imbalance $\theta_1$ and $\theta_2$ in plane one (480) and plane two (482), respectively, may readily be found, namely, $$\theta_1 = \tan^{-1} \frac{W_{1y}}{W_{1x}}$$

and $$\theta_2 = \tan^{-1} \frac{W_{2y}}{W_{2x}}$$

Finally, the weights of imbalance $W_1$ and $W_2$ in planes one (480) and two (482), respectively, are readily determined by solving $$W_1 = \frac{W_{1x}}{\cos\theta_1} = \frac{g[(d_2 + d_3) F_2 \cos\phi_2 - F_1 (d_1 + d_2 + d_3) \cos\phi_1]}{rw^2 d_3 \cos\theta_1}$$

and $$W_2 = \frac{W_{2x}}{\cos\theta_2} = \frac{g[(d_1 + d_2) F_1 \cos\phi_1 - d_2 F_2 \cos\phi_2]}{rw^2 d_3 \cos\theta_2}$$

These values are readily calculated by a programmable data processing system 490 properly interfaced 492 with encoder 366 to receive information from the assembly 30 relative to its zero axis orientation, and with load cells 222 and 224 to receive information from them relative to $F_1$, $\phi_1$, $F_2$, and $\phi_2$. The values for g, r, $d_1$, $d_2$, and $d_3$ will already be programmed into the system 490 (or be retrievable from storage 494) for a particular type of assembly 30 being tested.

The processing system includes storage 496 for trigonometric tables for inverse tangents, sines and cosines in, for example, one degree increments between 0° and 360° so that the system 490 can automatically calculate $\theta_1$, $\theta_2$, $W_1$ and $W_2$. An interface 498, such as the ALLEN BRADLEY 1313 AR-BOD controller, is provided with feedback through encoder 479 at orient station 44 to energize motor/brake combination 454/457 to place the $\theta_1$ location over angle marker assembly 472 for marking. Then motor/brake combination 454/457 is energized to place the $\theta_2$ location under angle marker assembly 174 for marking. $W_1$ and $W_2$ may be printed out by printer 500 or displayed on digital display 502, or both. A printout of $W_1\,\theta_1$, $W_2$ and $\theta_2$ is useful for quality control purposes.

The interface 492 includes, for example, separate zero crossing detectors of known types. These detectors detect when the output signals from the load cells 222, 224 change signs with respect to an arbitrary zero. Interface 492 also includes separate peak detectors with sample-and-hold capability of known types. The sample-and-hold peak detectors are actuated under the control of encoder 366 90° of rotation of an assembly 30 after zero crossings are detected by the zero crossing detectors. The sampled and stored signals are representative of the amounts of imbalance. The angular locations at which the samples are taken are the locations of imbalance.

What is claimed is:

1. A drive mechanism for use with an apparatus for determining the amount and location of imbalance of an article having two planes in which it is to be balanced and an axis about which it is to revolve, the apparatus including a base, means for supporting the article for substantially free revolution with respect to the base, a lever extending generally parallel to the axis of revolution of the article, means for mounting the lever for movement with the article supporting means, means for generating input signals in response to force exerted between the lever and the base as the article is revolved, means for generating first output signals related to the imbalance in the first plane and second output signals related to the imbalance in the second plane in response to the input signals, and means for coupling the input signal generating means to the output signal generating means, the input signal generating means including first and second input signal generating means, means for mounting the first input signal generating means between the lever and the base, means for mounting the second input signal generating means between the lever and the base a first predetermined non-zero distance from the first input signal generating means measured along the axis, the second input signal generating means being mounted a second predetermined non-zero distance from the first plane measured along the axis, and the drive mechanism including a motor and drive wheel mounted for rotation by the motor, means for movably mounting the drive wheel on the base for selective movement between a driving position in engagement with the article and a storage position out of engagement with the article, excitation of the motor and engagement of the drive wheel with the article causing the article to accelerate to a desired rotation frequency, and subsequent movement of the drive wheel out of engagement with the article permitting said article to coast and permitting movement of the article relative to the base in response to dynamic imbalance in the article free of the effect of any dynamic imbalance in the drive wheel, said movement generating said output signals which are used to determine the amount and location of inbalance of said article.

2. The apparatus of claim 1 wherein the article is a vehicle wheel and tire assembly, the first and second planes being the outer and inner planes of the wheel rim, and the axis being the axis of revolution of the wheel.

3. The apparatus of claim 1 wherein the base includes means for conveying the article to the article mounting means, means for conveying the article away from the article mounting means, and means for marking locations of imbalance for the application of corrective masses.

4. The apparatus of claim 1 wherein the means for mounting the lever includes flexible steel straps.

5. The apparatus of claim 1 wherein the first and second input signal generating means include first and second load cells, respectively, disposed between the lever and base the first predetermined distance from each other, the second load cell being disposed the second predetermined distance from the first plane, and the first and second planes being separated by a third predetermined distance.

6. The apparatus of claim 5 wherein the means for generating first and second output signals comprises means for processing the input signals from the first and second load cells to resolve such input signals in accordance with the relationships:

$$W_1 = \frac{g[(d_3 + d_2) F_2 \cos \phi_2 - (d_3 + d_2 + d_1) F_1 \cos \phi_1]}{d_3\, rw^2 \cos \theta_1}$$

$$\theta = \tan^{-1} \frac{W_{1y}}{W_{1x}}, \text{ where}$$

$$W_{1x} = \frac{g}{rw^2}\left[\left(1 + \frac{d_2}{d_3}\right) F_2 \cos \phi_2 - \left(\frac{d_3 + d_2 + d_1}{d_3}\right) F_1 \cos \phi_1\right],$$

and $$W_{1y} = \frac{g}{rw^2}\left[\left(1 + \frac{d_2}{d_3}\right) F_2 \sin \phi_2 - \left(\frac{d_3 + d_2 + d_1}{d_3}\right) F_1 \sin \phi_1\right];$$

$$W_2 = \frac{g[(d_2 + d_1) F_1 \cos \phi_1 - d_1 F_2 \cos \phi_2]}{d_3\, rw^2 \cos \theta_2};$$

$$\theta_2 = \tan^{-1} \frac{W_{2y}}{W_{2x}}, \text{ where}$$

$$W_{2x} = \frac{g}{rw^2}\left[\left(\frac{d_1 + d_2}{d_3}\right) F_1 \cos \phi_1 - \frac{d_2}{d_3} F_2 \cos \phi_2\right],$$

and $$W_{2y} = \frac{g}{rw^2}\left[\left(\frac{d_1 + d_2}{d_3}\right) F_1 \sin \phi_1 - \frac{d_2}{d_3} F_2 \sin \phi_2\right];$$

In which:
$F_1$ is the force component perpendicular to the article axis of revolution on the first load cell, $F_2$ is the force component perpendicular to the article axis on the second load cell, g is the gravitational constant, r is the predetermined distance from the article axis to the point of correction in both the first and second planes, w is the radian frequency of revolution of the article, $\phi_1$ is the phase angle between the location of imbalance in the first plane and a predetermined reference location, $\phi_2$ is the phase angle between the location of imbalance in the second plane and the reference location, $d_1$ is the first distance, $d_2$ is the second distance, $d_3$ is the third distance, $W_1$ is the amount of imbalance in the first plane, $W_{1x}$ is the component of that imbalance parallel to a first predetermined coordinate, $W_{1y}$ is the component of that imbalance parallel to a second coordinate perpendicular to the first, $W_2$ is the amount of imbalance in the second plane, $W_{2x}$ is the component of that imbalance parallel to a first predetermined coordinate, and $W_{2y}$ is the component of that imbalance parallel to a second coordinate perpendicular to the first.

7. A drive mechanism for use with an apparatus for determining dynamic imbalance in an article having first and second planes generally parallel to each other in which it is to be balanced and an axis generally perpendicular to the two planes about which it is to be rotated, the apparatus comprising a base, a spindle, a housing for freely rotatably supporting the spindle, spring means for mounting the housing from the base for substantially free movement in a plane including the axis of rotation of the spindle, the spindle including a chuck for mounting the article, first and second load cells disposed between the housing and the base in said plane to generate first and second input signals in response to force exerted between the housing and the base as the article is rotated, means for processing the first and second input signals to generate first output signals related to the imbalance of the article in the first plane and second output signals related to the imbalance of the article in the second plane, the base and housing including means for mounting the second load cell between the housing and base a first predetermined non-zero distance from the first load cell measured along the spindle axis of rotation, the second load cell being mounted a second predetermined non-zero distance from the first plane of the article, the drive mechanism including a motor, a drive wheel, means for mounting the drive wheel for rotation in response to actuation of the motor, means for mounting the drive wheel for movement relative to the base, means for selectively moving the drive wheel between a use position in which the drive wheel is in engagement with the article and a storage position in which the drive wheel is out of engagement with the article, actuation of the motor and engagement of the drive wheel with the article causing acceleration of the article to a predetermined rotation frequency, and disengagement of the drive wheel from the article permitting the article to coast on the spindle at about said frequency and exert forces upon the first and second load cells which are used to determine dynamic imbalance of the article.

8. The apparatus of claim 7 wherein the article is a vehicle wheel-and-tire assembly, the first and second planes being the outer and inner plane of the wheel rim and the axis being the axis of rotation of the wheel.

9. The apparatus of claim 7 wherein the base further includes means for conveying the article to the article mounting means, means for conveying the article away from the article mounting means, means for marking locations of imbalance for the application of corrective masses, and means for causing relative movement between the marking means and article to position the point of imbalance adjacent the marking means for marking.

10. The apparatus of claim 7 and further including a second wheel, means for movably mounting the second wheel from the base, means for selectively moving the second wheel into engagement with the article, actuation of the motor and engagement of the first-mentioned and second wheels with the article bringing the article to desired rotational frequency, and disengagement of the first-mentioned and second wheels from contact with the article permitting the article to continue to rotate at about said frequency and exert forces on the first and second load cells related to the dynamic imbalance of the article.

11. The apparatus of claim 10 wherein the means for movably mounting the motor from the base and for moving the first-mentioned and second wheels between their respective use and storage orientations moves the first-mentioned and second wheels such that the first-mentioned and second wheels engage the article at substantially diametrically opposed positions on the article circumference.

12. A drive mechanism for use with an apparatus for determining dynamic imbalance in an article having an axis about which it is to be rotated, the apparatus comprising a base, a spindle, a housing for freely rotatably supporting the spindle, spring means for mounting the housing from the base for substantially free movement in a plane including the axis of rotation of the spindle, the spindle including a chuck for mounting the article, means disposed between the housing and the base in said plane to generate input signals in response to force exerted between the housing and the base as the article is rotated, means for processing the input signals to generate output signals related to the imbalance of the article in a plane perpendicular to said axis, in which plane said article is to be balanced, the base and housing including means for mounting the means for generating the input signals, the drive mechanism including first and second motors, first and second drive wheels, means for mounting said drive wheels for rotation in response to actuation of the first and second motors, respectively, means for mounting said first and second drive wheels for movement relative to the base, means for selectively moving said first and second drive wheels between use positions in which said drive wheels are in engagement with the article and storage positions in which said drive wheels are out of engagement with the article, actuation of said motors and engagement of said drive wheels with the article causing acceleration of the article to a predetermined rotation frequency, and disengagement of said drive wheels from the article permitting the article to coast on the spindle at about said frequency and exert forces causing the means for generating the input signals to generate such input signals which are used to determine dynamic imbalance of the article.

13. The apparatus of claim 12 wherein the means for movably mounting the first and second drive wheels from the base and for moving the first and second drive wheels between their respective use and storage orientations moves the first and second drive wheels such that the first and second drive wheels engage the article at substantially diametrically opposed positions on the article circumference.

* * * * *